United States Patent [19]

Sexstone

[11] 3,884,741

[45] May 20, 1975

[54] METHOD AND APPARATUS FOR THE MANUFACTURE OF FILTER RODS CONTAINING PARTICULATE MATERIAL BY A SPLIT ROD TECHNIQUE

[75] Inventor: John H. Sexstone, Middletown, Ky.

[73] Assignee: Brown & Williamson Tobacco Corp., Louisville, Ky.

[22] Filed: Feb. 22, 1974

[21] Appl. No.: 445,311

[52] U.S. Cl.................. 156/259; 93/1 C; 93/77 FT; 131/10.7; 131/261 B; 131/265; 156/276
[51] Int. Cl.......................... A24b 15/02; A24d 1/06
[58] Field of Search ........... 156/176, 180, 257, 276, 156/166, 152, 259, 279, 433, 441, 583, 436, 202, 512; 131/10.7, 261 B, 265, 266; 93/1 C, 77 FT; 28/1 CF

[56] References Cited
UNITED STATES PATENTS

| 3,371,000 | 2/1968 | Davenport et al. | 156/180 |
| 3,743,528 | 7/1973 | Colleson | 117/16 |
| 3,762,281 | 10/1973 | Burrus et al. | 156/203 |
| 3,837,264 | 9/1974 | Sextone | 131/10.7 |

FOREIGN PATENTS OR APPLICATIONS 1,346,536 2/1974 United Kingdom 1,204,018 9/1970 United Kingdom............ 131/261 A

OTHER PUBLICATIONS

Hawkins et al., Defensive Publication 775576, March 1969, 156-180.

Primary Examiner—Douglas J. Drummond
Assistant Examiner—Michael W. Ball
Attorney, Agent, or Firm—Finnegan, Henderson, Farabow & Garrett

[57] ABSTRACT

Method and apparatus for forming filter rods containing particulate material. The method is characterized by providing a filter rod of filtering material having a longitudinal axis and cutting that rod in the direction of the axis, exposing the interior of the rod, providing pockets at axially spaced intervals in the interior of the rod, depositing particulate material therein and closing and sealing the rod. The apparatus disclosed includes means for transporting a filter rod, a cutting wheel for severing the rod in the direction of its longitudinal axis, hot die means for impressing pockets within the interior of the split rod, means for depositing particulate material in the formed pockets and means for closing the rod about the particulate material and sealing the split rod.

9 Claims, 11 Drawing Figures

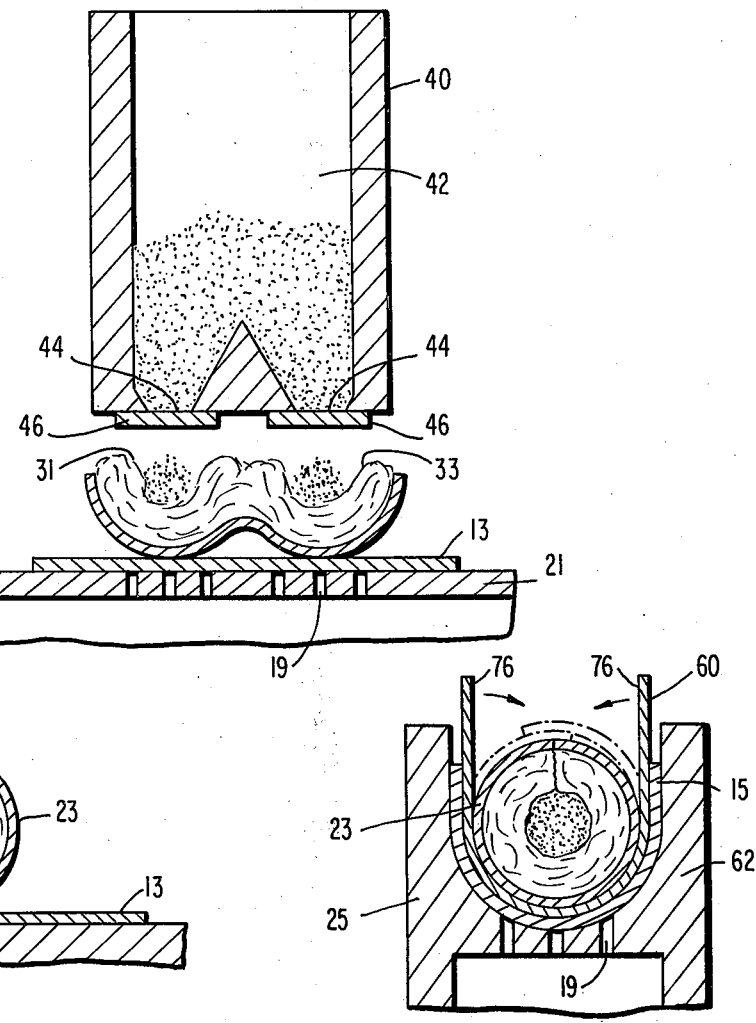
FIG. 5
FIG. 6
FIG. 7
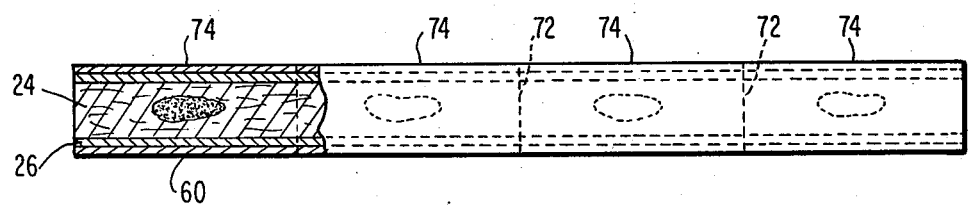
FIG. 8

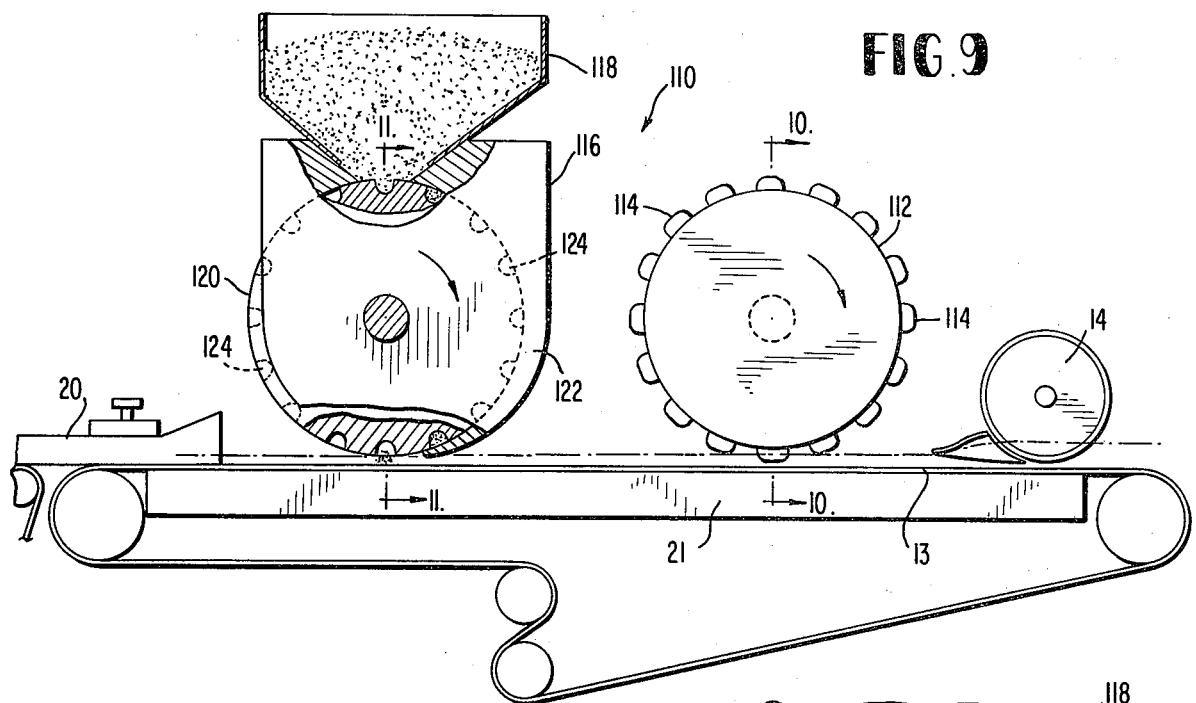
FIG. 9
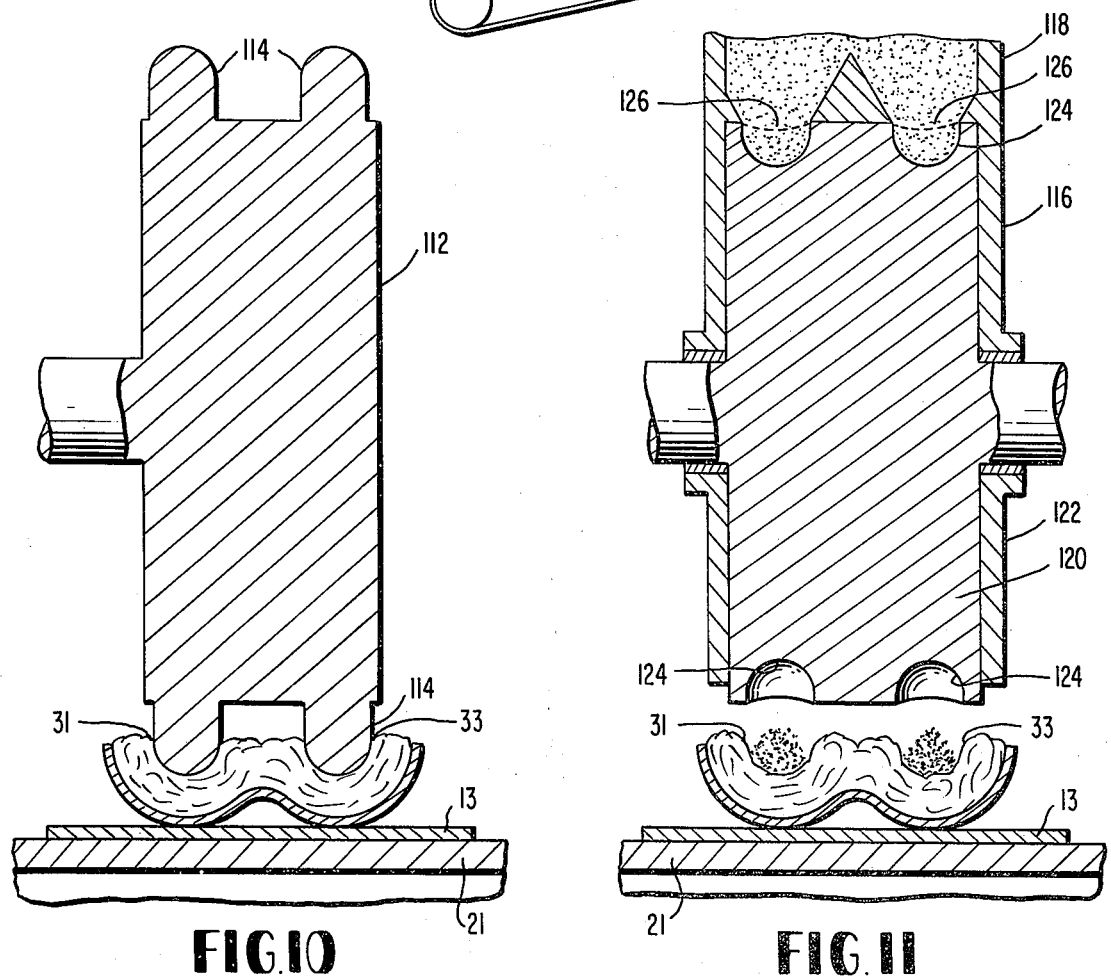
FIG. 10
FIG. 11

METHOD AND APPARATUS FOR THE MANUFACTURE OF FILTER RODS CONTAINING PARTICULATE MATERIAL BY A SPLIT ROD TECHNIQUE

BACKGROUND OF THE INVENTION

1. Field of the Invention

This invention relates to a method and apparatus for the manufacture of filter plugs for use in cigarettes and like articles.

More particularly, this invention relates to a method and apparatus for the manufacture of such filter plugs from a formed filter rod of a material such as cellulose acetate by splitting the rod, forming axially spaced pockets in the interior of the rod and depositing particulate material therein and cutting the rod between said deposits to provide individual filter plugs each having cores of particulate material.

2. Description of the Prior Art

In the past, the industry has expended considerable time and capital in the development of filter plugs having zones, regions or parts thereof comprised of loose particulate or granular material. Numerous problems, however, have developed both in providing commerically practicable processes and apparatus for the manufacturing of such filters and in providing a filter plug which accomplishes the desired filtering in a manner pleasing and acceptable to the consumer.

During the 1960's, numerous patents were issued directed to the technique of providing spaced cylindrical plugs of a first material on a continuous wrapper and depositing particulate material on that wrapper and between the spaced plugs. The wrapper is then closed about the spaced plugs and the particulate material to provide a filter rod.

These techniques have met with varying degrees of success. The handling of the short plug lengths in high speed machinery results in considerable wastage and down time for production machinery. Moreover, problems have been encountered because of the difficulty of completely filling the particulate sections of the filter rod. Particulate material, unless very firmly packed, will shake down upon vibration producing air spaces, particularly between the wrappers and the particulate material. The smoke, seeking the path of least resistance, moves through this air space as opposed to filtering through the particulate material. Where this occurs, the desired filtering is not achieved.

Applicant has found it highly beneficial to form the particulate material zones within the core of filtering materials, such as cellulose acetate or paper. The filtering material completely surrounds the particulate material as opposed to having the particulate material bounded by a wrapper. Because of the compressibility and resiliency of the filtering material, there is a tendency for the material to hold the particulate zones in tight compaction. In this instance, the vibration of the cigarettes during production, handling and shipping does not create the air spaces characterized by filter plugs having the particulate material bounded by a wrapper.

Formation of such filters where the particulate material is bounded by filtering material, however, poses many other problems. For instance, it is very difficult to control the location of the particulate material within the filter rod, particularly when particulate material is being deposited on a moving web and that web is then gathered into a filter rod.

This particulate material tends to migrate during the filter forming operation into areas or zones of the filter where it is of little filtering value and may provide the distasteful result of causing the smoker's mouth to contact the particles.

The prior art discloses the injection of particulate material into a preformed filter plug. In particular, the patent to Davenport U.S. Pat. No. 3,371,000 discloses, in relation to FIGS. 10 through 13, a process wherein the two is formed into a plug, a wrapper partially enwraps the rod and a needle-nozzle combination is utilized to penetrate the rod and deposit a slurry material therein at spaced positions. The slurry, however, upon drying, leaves spaces within the plug and thus the end product contains a very loosely filled area of particulate material. Moreover, it is difficult to control the location of that area of particulate material as the slurry will tend to penetrate to the center portions of the filter in manners dependent upon the nature of the tow, the way it was gathered into the filter rod, and the degree to which setting of the plasticizer has occured — all of these variables contribute to a filter of variable quality.

Accordingly, it is a primary object of this invention to provide a new and improved method and apparatus for forming filters containing particulate material to alleviate the aforementioned difficulties in the art.

A further object of this invention is to provide such a new and improved method and apparatus that may be utilized commerically in relation to high-speed cigarette making operations in an inexpensive and efficient manner.

Another object of this invention is to produce a high quality filter plug having the desired characteristics for properly filtering the smoke.

A further object of this invention is to provide such a new and improved method and apparatus which will produce a filter rod having a tightly packed zone or area of particulate material therein and which will retain its tight packing even after the cigarettes have been processed, packaged, shipped and otherwise handled causing numerous vibrations of the cigarettes which would otherwise tend to settle the particulate material and produce air spaces in the particulate material zone.

Yet another object of this invention is to provide such a method and apparatus which will permit the formation of a controlled zone of particulate material within a filter plug, the zone being accurately positioned in all filter plugs in order to obtain a consistency of filtering characteristics.

Additional objects and advantages of this invention will be set forth in part in the description which follows and in part will be obvious from the description or may be learned by practice of the invention. The objects and advantages of the invention may be realized and attained by means of the instrumentalities and combinations particularly pointed out in the appended claims.

SUMMARY OF THE INVENTION

To achieve the foregoing objects, and in accordance with the purpose of this invention as embodied and broadly described herein, the method of this invention comprises the steps of providing a filter rod of filtering material having longitudinal axis, cutting the rod in the direction of the axis, opening the rod to expose the interior of the rod, providing pockets at axially spaced positions in the interior of the rod, depositing particulate material in the pockets, closing the rod about the particulate material and sealing the rod. Preferably the rod is cut through to the extent necessary to lay open the rod to provide a pair of exposed surfaces and pockets are impressed in each of said surfaces in adjacent positions, such positions being axially spaced along said rod.

To also achieve the foregoing objects, and in accordance with the purposes of this invention as embodied and broadly described herein, the apparatus of this invention comprises means for conveying a filter rod of filtering material having a longitudinal axis, means for cutting the rod in the direction of the axis, means for opening the rod to expose the interior of the rod, means for providing pockets at axially spaced positions in the interior of the rod, means for depositing particulate material in the pockets, means for closing the rod about the particulate material and means for sealing the severed rod.

This invention is an improvement over the process in applicant's U.S. Pat. No. 3,837,264.

BRIEF DESCRIPTION OF THE DRAWINGS

The invention consists of the novel parts, instructions, arrangements, combinations and improvements shown and described. The accompanying drawings which are incorporated in and constitute a part of the specification illustrate two embodiments of the invention, and together with the description, serve to explain the principles of the invention.

FIG. 5 is a sectional view taken on line 5—5 of FIG. 1 disclosing the particulate material deposition means as it is depositing particulate material in the formed pockets of the severed filter rod.

FIG. 6 is a sectional view taken on lines 6—6 of FIG. 1 showing the filter rod closed about the particulate material.

FIG. 7 is a sectional view taken on line 7—7 of FIG. 1 illustrating a sealed rod with a second wrapper about the severed filter rod.

FIG. 8 is a plan view of a segment of a filter rod having a portion thereof broken away to show the first wrapper about the filtering material, the sealing wrapper on the exterior thereof and the particulate material deposit in the center of the filtering material. Transverse dashed lines illustrate the points where the filter rod is to be cut to form individual filter plugs.

FIG. 9 is a side elevational view of a modified form of this invention illustrating an apparatus for continuously feeding a rod, severing the rod, forming pockets and filling the pockets with particulate material.

FIG. 10 is a sectional view taken on line 10—10 of FIG. 9 showing a hot die wheel for forming pockets in the continuously fed rod.

FIG. 11 is a sectional view taken on line 11—11 of FIG. 10 showing a particulate material deposition wheel for depositing particulate material in the formed pockets of the split rod.

DESCRIPTION OF THE PREFERRED EMBODIMENT

Figure 1:
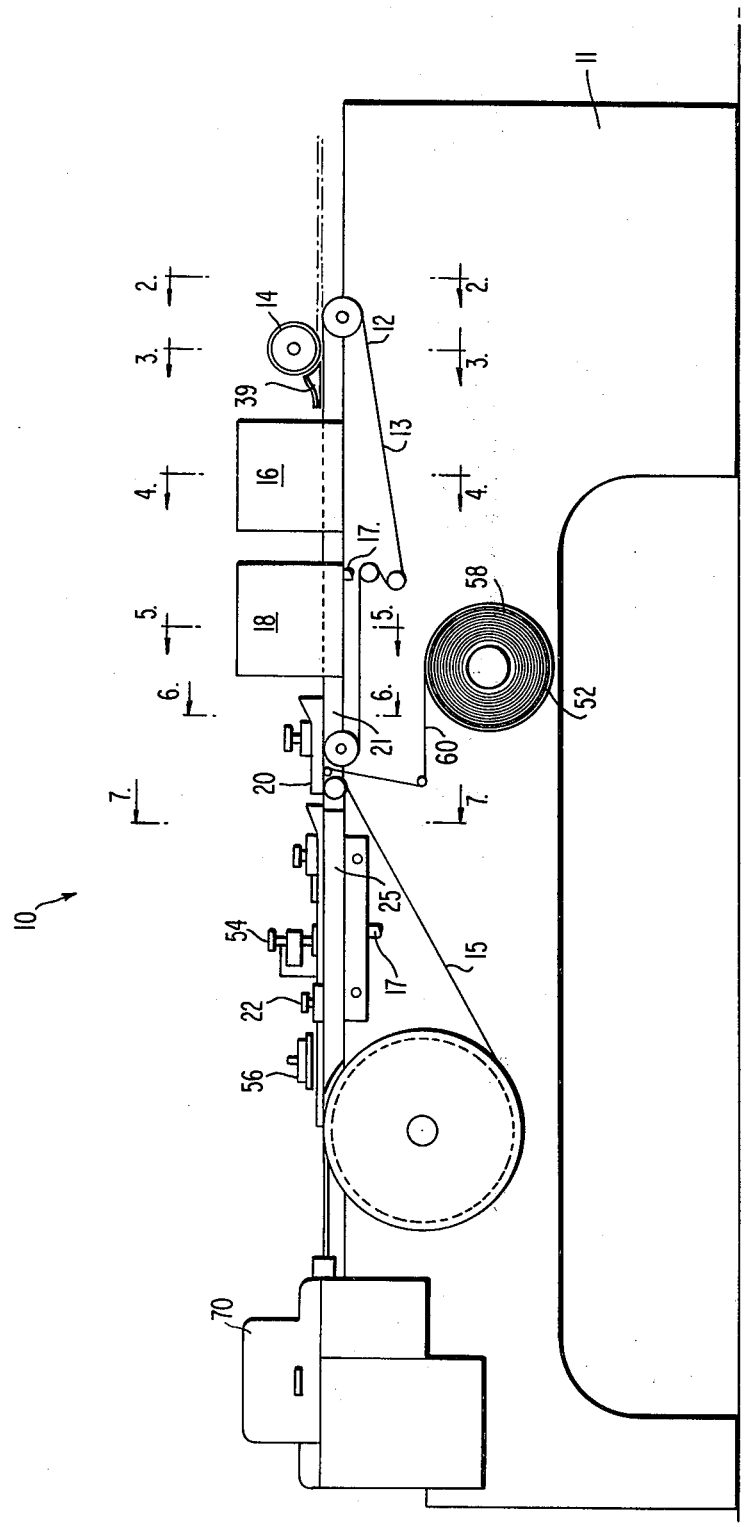
FIG. 1 is a side elevational view of the apparatus of this invention.

Referring to FIG. 1 of the drawings, an apparatus 10 is illustrated and broadly comprised of a frame 11 having operatively mounted thereon a filter rod conveyor assembly 12, cutter assembly 14, pocket forming means 16, particulate material deposition assembly 18, rod closing means 20 and a rod sealing assembly 22.

Figure 2:
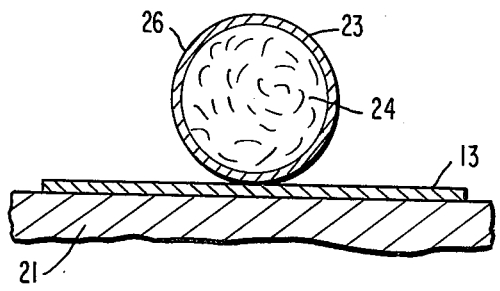
FIG. 2 is a sectional view taken on line 2—2 of FIG. 1 showing the filter rod before severing.

In accordance with this invention, the supplied filter plug is preferably comprised from a web of fibrous cellulose acetate, however, material such as paper, bulk yarn, other filamentary tow or any other suitable material may be utilized. Preferably, the filter material is formed into a rod and wrapped with a suitable filter plug wrapper. The filtering material should be subjected to a plasticizing step before gathering into a rod. Cellulose acetate is usually plasticized by triacetin. Referring to FIG. 2, the filter rod 23 is comprised of a cellulose acetate filtering material 24 and a wrapper 26.

The material to be deposited within the pockets of the split rod must have the desired absorbative and adsorbative properties, and be either in particulate or granular form. The particulate material may be finely divided charcoal, silica gel, volcanic salts, ion exchange resins, clays and the like. A particular additive contemplated by this invention is the ion exchange resin, DUOLITE which may be of the type disclosed in commonly assigned U.S. Pat. No. 3,716,500 granted Feb. 13, 1973.

In the illustrated embodiment, a means 12 is provided for conveying the filter rod 23. It is contemplated that the rod 23 will have been formed in a conventional garniture assembly. While it is deemed preferable for the rod 23 to include a wrapper 26, it is not considered necessary. It is also preferable for the filtering material 24 of the rod 23 to be plasticized and set before cutting or splitting of the rod.

In the illustrated embodiment of FIGS. 1 through 7, the conveyor means 12 provides an intermittent movement of the rod 23 in a conventional manner. Thus, the rod 23 is stationary during the steps of pocket formation and deposition. The rod 23, however, may be continuously conveyed with several modifications to the apparatus, primarily the substitution of different pocket forming and deposition means. An apparatus for continuously conveying the rod is illustrated in FIGS. 9 through 11.

In accordance with this invention the means for conveying the rod 23 of filter material is comprised of a conveyor assembly 12. Assembly 12 includes an endless conveying tape 13 on which rod 23 rests as it moves through the cutting, deposition and closing steps. A second endless tape 15 is provided for movement of the rod through the rod sealing assembly 22. Each of the tapes 13 and 15 are mounted on conventional tape drive assemblies.

Rod 23 is retained in position on tapes 13 and 15 by means of a vacuum drawn through the tapes. The vacuum assemblies, characterized by numeral 17, are conventional in nature. As illustrated in FIGS. 5 and 7, the vacuum is drawn through apertures 19 in the respective bases 21 and 25 of the sections of the apparatus 10 served by conveying tapes 13 and 15.

In accordance with the invention, the means for cutting the rod 23 is characterised by a cutter assembly 14. It is the function of the assembly 14 to axially sever rod 23 so that rod 23 may be sufficiently opened to expose its interior. Pockets may then be formed in the exposed interior at axially spaced positions. Particulate material is deposited in those pockets.

Preferably, the cutter assembly 14 is comprised of a cutting wheel 28, operatively carried by a rotatably driven shaft 30. The shaft 30 extends in a direction normal to the axis of the rod and is suitably mounted in a conventional manner on frame 11. The assembly 14 also includes driving means of a conventional nature, not illustrated, for rotatably driving shaft 30.

Figure 3:
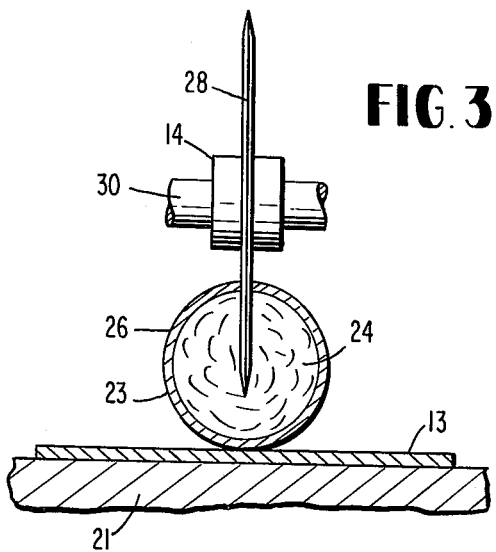
FIG. 3 is a sectional view taken on line 3—3 of FIG. 1 illustrating the filter rod at the point where it is severed by a cutting wheel.
Figure 4:
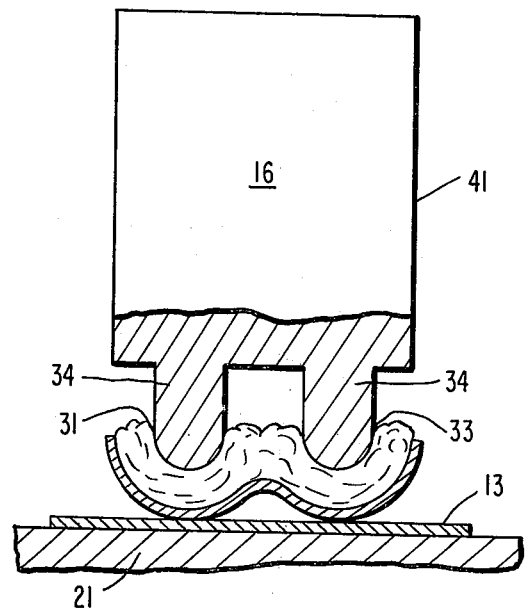
FIG. 4 is a sectional view taken on line 4—4 of FIG. 1 showing a hot die for impressing the pockets at spaced positions axially of the severed rod.

Referring to FIG. 3, the cutting wheel 28 is mounted in spaced relation above conveying tape 13. In this embodiment, the rod 23 is not severed completely but only to the extent necessary to lay open the rod as illustrated in FIG. 4 providing a pair of exposed surfaces 31 and 33. The cutting wheel 28 could also be positioned to completely sever rod 23, allowing the two sections to lay open in side by side relation.

It is also contemplated that the surfaces 31 and 33 need not be laid completely open as illustrated in FIG. 4. In this instance, the cutting wheel 28 may penetrate the rod 23 only to its mid-point or slightly above. The rod would be held sufficiently apart for the dies to penetrate to the core of the rod 23 to provide a pocket therein for receipt of the particulate material.

In accordance with the invention, the means for opening the rod 23 to expose the interior of said rod is comprised of an opener 39. The opener 39 is preferably a plow shaped device having a forward edge positioned in the severed rod and diverging side walls to cause the severed rod to spread apart and finally lay open for further processing.

In accordance with the invention, the means for providing the pockets at axially spaced positions in the interior of the rod is characterized in FIG. 1 by pocket forming assembly 16. The assembly 16 includes means spaced axially of the filter rod 23 and reciprocally movable to impress pockets in surfaces 31 and 33.

Preferably, the assembly 16 is comprised of a plurality of pairs of dies 34 and a heating means 41. The die pairs are spaced axially of the path of travel of rod 23 with individual dies spaced normally of said path to impress aligned juxtapositioned pockets in each of the exposed surfaces 31 and 33.

In the preferred embodiment, the dies 34 are heated by heating means 41 to a sufficient temperature to ensure that the filtering material will remain depressed at least until deposition of the particulate material and sealing of the filter rod 23. The drive mechanism of assembly 16 is not disclosed as such mechanisms for vertical reciprocation of such die members is conventional in numerous arts.

Where rod 23 is severed to a lesser degree, perhaps only to the mid-point of the rod, as previously discussed, only one die 34 would be necessary at each point of pocket formation. In such an embodiment, the rod 23 would be held open during deposition of the particulate material. It is considered preferable, however, that the rod be laid open in the manner disclosed in FIG. 4.

It is also contemplated that a pocket be formed in only one of the sections 31 or 33. In this instance, only one of the dies 34 in each of the pairs would be utilized.

While the apparatus 10 illustrated in FIG. 1 operates with an intermittent movement of rod 23, a continuously operating process and apparatus is contemplated and illustrated as apparatus 110 in FIGS. 9 through 11. Instead of a reciprocating die 34, a rotating die wheel 112 is provided with pairs of dies 114 mounted at spaced positions on the circumference of wheel 112 to impress the pockets. The wheel 112 can be modified to provide single dies 114 at each circumferential position in accordance with the discussion regarding formation of single pockets at spaced axial positions of rod 23.

In accordance with the invention, the means for depositing particulate materials in the formed pockets can be of any conventional type for intermittently feeding particulate material to a web of filtering material. Preferably, the deposition assembly is comprised of a hopper 40, as illustrated in FIG. 5, having a compartment 42 for receiving particulate material by any conventional supply mechanism. The hopper 40 defines a plurality of apertures 44 in paired relation. The pairs of apertures 44 are spaced axially of the path of conveyance of the filter rod so that during dwells in the intermittent movement of the rod, particulate material is deposited through the apertures 44 and into the pairs of pockets formed by assembly 16. The apertures 44 are opened and closed by means of sliding gates 46, positioned in relation to each of the apertures 44. The gates 46 are moved to and from a closed position by conventional means in synchronization with the intermittent movement of the rod 23. Other forms of deposition means may be employed so long as an adequate mechanism is provided for depositing particulate material into the formed pockets.

Referring to FIGS. 9 through 11, the apparatus 110 includes a deposition wheel assembly 116. Assembly 116 is comprised of a hopper 118, a deposition wheel 120 and a housing or casing 122. As illustrated, the wheel 120 defines pairs of circumferentially spaced recesses 124. The recesses 124 are filled with particulate material as they revolve past an aligned pair of apertures 126 in the base of hopper 118. The material is retained in recesses 124 by casing 122 until the recess 124 are positioned above respective pockets in rod 23. At that time, the material is deposited into the pockets of the moving rod 23.

In accordance with the invention, the means for closing the rod 23 about the particulate material deposit is characterized by closing assembly 20. Assembly 20 is a conventional barrel closing device. Rod 23 is received in a wide opening in the entry end of a barrell in the form illustrated in FIG. 5. The barrel sides gradually converge to cause the opened rod to close to the condition illustrated in FIG. 6. A similar device can be utilized where rod 23 is completely severed to bring the severed sections back into aligned rod-like formation. This type of folding barrel is conventional in numerous arts.

In accordance with the invention, the means for sealing the rod 23 is comprised of a conventional assembly 22 including a wrapper assembly system 52, adhesive applicator 54 and heater 56. In the illustrated embodiment the wrapper supply system 52 supplies a wrapper 60 from a reel 58 in a conventional manner to a position between rod 23 and conveying tape 15 as illustrated in FIG. 7.

The assembly 22 also includes a channel shaped base 25 extending through assembly 22 and having a vacuum means 17 drawing a vacuum through apertures 19 in channel base 25 for retaining the rod 23 and the wrapper 60 in position. Once the rod and wrapper are positioned, adhesive is applied by applicator 54 and the rod passed through heater 56 to set the adhesive. The illustrated wrapper completely enwraps rod 23 with an overlapped joint formed, however, other tapes could be employed that enwrap the rod to the extent necessary to cover the cut line or lines on rod 23.

The rod 23 is then passed through a conventional cutter assembly 70 where the rod is severed in a manner illustrated in FIG. 8 along lines 72 to provide individual filter plugs 74. As illustrated, each of the plugs 74 contain a duel wrap, filter material and a core of particulate material.

The apparatus described in relation to FIG. 1 for the closing, sealing and severing of filter plugs is identical whether the rod is continuously or intermittently conveyed. Thus, the same types of means are provided in the apparatus of FIGS. 9 through 11 for accomplishing these steps as described in regard to FIG. 1.

In accordance with the invention, the method of manufacturing tobacco smoke filters comprising this invention commences with providing a filter rod of filtering material having a longitudinal axis. Preferably, the rod 23 is fed directly from a conventional rod-forming apparatus to the cutter assembly 14.

In accordance with the invention, the method then includes the step of cutting the rod 23 in the direction of the longitudinal axis. The rod 23 may be cut to various depths, although it is deemed preferable to make the cut to a sufficient depth that the rod can be laid open but without separating the rod into two sections. It is possible, however, to cut the rod 23 to a depth of approximately its center line or slightly above, in which case the rod would only be pulled apart slightly for insertion of the dies to the interior of the rod to form the pockets. The rod could also be completely severed providing two separate sections in side by side relation. Preferably the rod 23 is cut by a cutting wheel 28 which is rotatably driven about an axis normal to the path of travel of rod 23.

In accordance with this invention, the method then continues with the step of providing pockets at axially spaced positions in the interior of rod 23.

Preferably, the spaced pockets are provided in each of the surfaces 31 and 33 at adjacent positions. Closing the rod places the pockets of the respective surfaces together to form a single pocket for housing a core of particulate filter material.

In the illustrated embodiment, the pockets are formed by applying heat and pressure to the center of each of the surfaces 31 and 33 by means of a heated die 34. Sufficient heat is applied so that the pockets will retain their shape until the rod is sealed. It is possible, however, depending upon the character of the filtering material to depress the filter material without application of heat. The filter material must remain depressed for a sufficient length of time to place the particulate material within the pockets and seal the rod. It is preferable that the pockets not be so permanently formed that the filter material will not respond with some resilience to compress the particulate material into a tightly packed core.

As previously discussed, it is possible to provide only a single pocket at each axially spaced position. For instance, a single pocket is employed where surfaces 31 and 33 are separated for insertion of the die 34 to its interior without completely opening the rod. It is also possible to provide the pocket in only one of the surfaces 31 or 33 as desired even when the rod is severed and laid open as illustrated in FIG. 5.

In accordance with the invention, the method then includes the step of closing the rod about the particulate material. This step occurs in assembly 20 wherein the rod sections are gradually moved through a folding barrel into contacting aligned relation as illustrated in FIG. 6.

In accordance with the invention, the rod is then sealed to permanently join the severed sections. While various techniques could be employed in this regard, it is deemed preferable to provide a second wrapper 60 which either partially or completely enwraps the filter rod 23. If completely enwraped, an overlapping adhesively secured joint could be provided. As previously discussed a tape could be employed which simply overlaps the cut line in rod 23 and is adhered to each side of the wrapper 26 adjacent that line.

The rod so sealed is then subjected to a conventional cutting step to sever the rod into individual filter plugs 74. As illustrated in FIG. 8 the rod is cut along lines 72 to provide plugs 74.

It will be apparent to those skilled in that art that various modifications and variations could be made in the method and apparatus constituting this invention without departure from the scope and spirit of the invention.

What is claimed is:
1. A method of manufacturing tobacco smoke filters comprising the steps of:
 a. providing a preformed filter rod of filtering material having a longitudinal axis,
 b. cutting said rod in the direction of said axis,
 c. spreading apart the cut rod to expose the interior of said rod,
 d. providing pockets at axially spaced positions in the interior of said rod prior to depositing particulate material,
 e. depositing particulate material in said pockets,
 f. closing the rod about said particulate material, and
 g. sealing the rod.

2. A method as recited in claim 1 wherein the rod is cut into two separate sections and the axially spaced pockets are provided in at least one of the sections.

3. A method as recited in claim 2 wherein the axially spaced pockets are provided in both of said sections at adjacent positions whereby closing of the rod places the pockets of the respective sections together to form a core of particulate filter material.

4. A method as recited in claim 1 wherein the rod is cut through to the extent necessary to lay open the rod to provide a pair of exposed surfaces and the axially spaced pockets are provided in at least one of the exposed surfaces.

5. A method as recited in claim 4 wherein the axially spaced pockets are provided in both of the exposed surfaces at adjacent positions whereby closing of the rod places the pockets of the respective surfaces together to form a single pocket defining a core of particulate filter material.

6. A method as recited in claim 1 wherein the pockets are formed by applying heat and pressure to the interior of the rod.

7. A method as recited in claim 1 wherein the rod is sealed by providing a wrapper about the rod and adhering the wrapper to the rod.

8. A method as recited in claim 1 wherein the rod is sealed by a tape extending axially of the rod and overlapping the surfaces of the rod adjacent the cut, said tape being adhered to said surfaces.

9. A method as recited in claim 1 wherein the filter rod includes a wrapper secured about a filtering material.

* * * * *

UNITED STATES PATENT OFFICE
CERTIFICATE OF CORRECTION

Patent No. 3,884,741    Dated  May 20, 1975

Inventor(s)  John H. Sexstone

It is certified that error appears in the above-identified patent and that said Letters Patent are hereby corrected as shown below:

Col. 2, line 12, delete "two" and insert -- tow --.

Col. 6, line 54, change "barrell" to -- barrel --;

Col. 6, line 64, delete "assembly" and insert -- supply --.

Signed and Sealed this second Day of September 1975

[SEAL]

Attest:

RUTH C. MASON
Attesting Officer

C. MARSHALL DANN
Commissioner of Patents and Trademarks